United States Patent
Alas et al.

(10) Patent No.: US 10,447,480 B2
(45) Date of Patent: Oct. 15, 2019

(54) EVENT VERIFICATION RECEIPT SYSTEM AND METHODS

(71) Applicant: Guardtime IP Holdings Limited, Tortola (VG)

(72) Inventors: Risto Alas, Tallinn (EE); Hema Krishnamurthy, Phoenix, AZ (US)

(73) Assignee: Guardtime SA, Lausanne (CH)

( * ) Notice: Subject to any disclaimer, the term of this patent is extended or adjusted under 35 U.S.C. 154(b) by 233 days.

(21) Appl. No.: 15/394,842

(22) Filed: Dec. 30, 2016

(65) Prior Publication Data

US 2018/0189312 A1 Jul. 5, 2018

(51) Int. Cl.
*H04L 9/32* (2006.01)
*G06F 21/64* (2013.01)

(52) U.S. Cl.
CPC .......... *H04L 9/3239* (2013.01); *G06F 21/64* (2013.01); *H04L 2209/38* (2013.01); *H04L 2209/56* (2013.01)

(58) Field of Classification Search
CPC .......... H04L 9/3239; H04L 2209/56; H04L 2209/03; G06F 21/64
See application file for complete search history.

(56) References Cited

U.S. PATENT DOCUMENTS

| | | | |
|---|---|---|---|
| 9,679,276 B1* | 6/2017 | Cuende | G06Q 20/065 |
| 2005/0114666 A1* | 5/2005 | Sudia | H04L 9/3236 |
| | | | 713/175 |
| 2015/0039893 A1* | 2/2015 | Buldas | H04L 9/3239 |
| | | | 713/176 |
| 2017/0034217 A1* | 2/2017 | Anton | H04L 63/20 |
| 2017/0279818 A1* | 9/2017 | Milazzo | H04L 63/1416 |
| 2017/0323392 A1* | 11/2017 | Kasper | G06Q 40/12 |
| 2017/0364552 A1* | 12/2017 | Pattanaik | H04L 9/3297 |
| 2017/0366516 A1* | 12/2017 | Pattanaik | H04L 63/0428 |
| 2018/0082256 A1* | 3/2018 | Tummuru | G06Q 10/1053 |
| 2018/0101701 A1* | 4/2018 | Barinov | H04L 63/12 |

OTHER PUBLICATIONS

Vaughan, Wayne, et al., "Chainpoint—A scalable protocol for anchoring data in the blockchain and generating blockchain receipts", Jun. 29, 2016.

* cited by examiner

*Primary Examiner* — David T. Brooks
(74) *Attorney, Agent, or Firm* — Jeffrey Pearce (57) ABSTRACT

Blockchain blocks are provided with either or both of two element types that enable later verification of block validity. One element type is identifiers, such as signatures, of trusted validators that approve entry of the block into the blockchain. Another element is a history hash tree that encodes data from not only the current block, but also at least one previous block.

12 Claims, 7 Drawing Sheets

EVENT VERIFICATION RECEIPT SYSTEM AND METHODS

FIELD OF THE INVENTION

This invention relates to data verifiability, in particular, registration and verification systems that use blockchains.

BACKGROUND

Data security has rapidly progressed from being an issue for only a few government and military entities to being a concern for almost everybody who uses or even deals with those who use a computer, "smart phone", etc. "Security" can mean many things depending on the context. Just two of the very many examples are preventing others from accessing personal or otherwise confidential data, and detecting tampering. Sometimes, "security" means just being able to prove that some digital event happened or did not happen.

A common way to ensure data security is to have a trusted repository, with access controlled using such devices as passwords, digital certificates, encryption and keys, etc. In one sense, this simply removes the problem to a higher level, in that one must then trust the security procedures of the repository, the authority that issued the certificates and keys, etc. Moreover, the need for verifiability is increasing rapidly, with countless financial, business, technical, and other events being recorded in some way in remote storage such as in the "cloud". With the advent of the "Internet of Things", in which essentially everything that can pass data to a network may be communicating information for storage, central repositories and verification mechanisms are becoming more and more impractical.

One development that is showing promise as a way to register and verify information without reliance on centralized control is a decentralized data structure known as a "blockchain". See FIG. 1. Although the term "blockchain" itself, as well as related terms, do not yet have universally accepted definitions, typically a "blockchain" 1000 is understood as being a data structure comprising a series of usually (but not necessarily) time-stamped blocks $b_i, \ldots, b_{j-2}, b_{j-1}, b_j, \ldots$, where each block includes not only submitted data, but also a $\mathcal{H}$ of all or some subset of the contents of the block, plus various metadata, hashed together with linking data, such as the hash output, of all or some sub-set of the data in an immediately preceding block. Thus, for example, block $b_j$ not only contains it own hash value $\mathcal{H}_j$, but also a link from the previous block $b_{j-1}$ based on its hash value $\mathcal{H}_{j-1}$.

Figure 1:
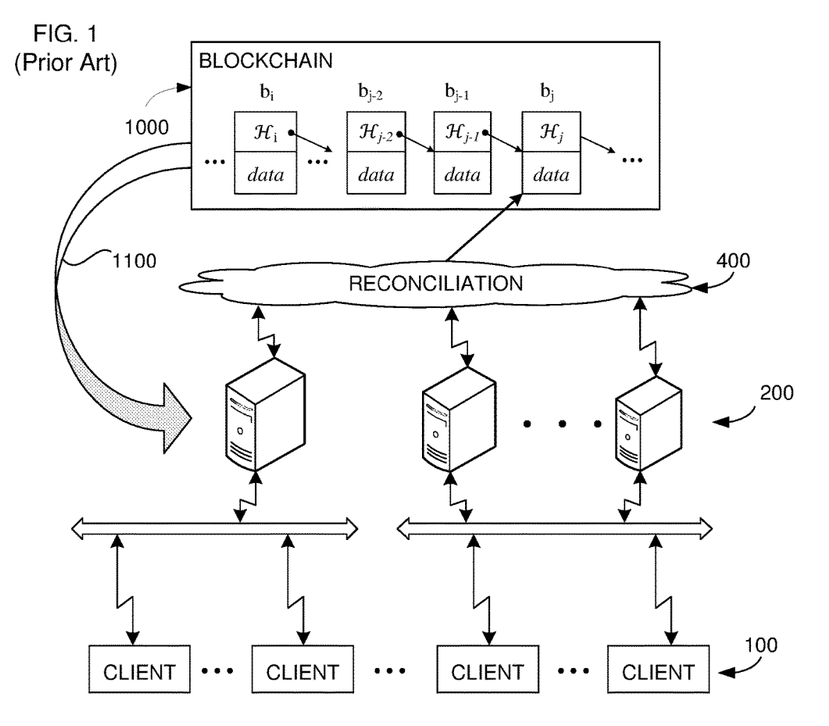
FIG. 1 illustrates the general structure of a blockchain system in the prior art.

As FIG. 1 illustrates, data to be entered in the blockchain 1000 may be submitted as "transactions" by any of a set of client systems 100, via one or more communications channels such as networks, to one or more intermediate nodes 200, such as servers, which may also create transactions and comprise clients in their own right. The nodes 200 then typically aggregate one or more transactions into data blocks, and then some reconciliation mechanism 400 is applied to determine which blocks of which nodes are to be included in which order in the actual blockchain 1000, which may then be distributed (indicated by arrow 1100) or at least made accessible to the nodes 200.

Different reconciliation protocols have been suggested, the most common of which is the "proof of work" (PoW) arrangement used in the Bitcoin system. According to the PoW protocol, highest level ones of the nodes 200 act as "miners" who must solve a difficult computational problem; the first to solve it—which is easily verifiable by other nodes—is then allowed to enter the next block in the chain 1000. One known problem with the PoW arrangement is that it can have a settlement time on the order of many minutes, or at least many seconds, which leads to severe problems of scalability.

As another example, in some other systems, the various nodes "vote" and, according to some predetermined routine, come to a consensus as to which block is to be entered next into the blockchain 1000. Still other reconciliation protocols are known. One problem with such a voting protocol is that the set of voting nodes may change over time. One or more, for example, may become unavailable, no longer a member of the group, such that later confirmation of the "votes" may become difficult or, if reliant on currently unavailable and/or invalid keys, impossible. The network of servers established to enable verification of events recorded into blocks of the blockchain may therefore no longer be able to perform its intended function.

However it is established, the blockchain can then be used as, or as the basis of, a public ledger, which is typically an append-only database achieved by distributed consensus of multiple participants. Once data is entered into a block of the chain, the entry is essentially irrefutable, since any tampering with the data would be reflected in the chained hash calculations and thus easily detected.

As with other "real-life" transactions, users such as the clients 100 and/or the nodes 200 may want or need proof that a transaction was actually entered into the blockchain 1000. In other words, there is a need for an efficient way to provide blockchain receipts. One difficulty in this regard is that, for proper verification that a block exists in the blockchain, many existing blockchain systems require calculation along the chain from some known valid point and through every intermediate block. This is turn presupposes that all the intermediate blocks are stored and available, which typically precludes deletion of those blocks, for example, to save storage.

DETAILED DESCRIPTION

This invention involves different embodiments that involve including in blocks of a blockchain various features that enable creation of a "receipt" that helps prove that a transaction or block was validly entered into the blockchain. Thus, different embodiments improve the functioning of the network of systems, such as servers, by helping them reduce or totally eliminate ambiguity that otherwise might defeat their purpose and or at best require inefficient, extra inter-server communication.

One current point of dispute when it comes to the concept of a "blockchain" is whether, by definition, any entity may be allowed to submit blocks to and verify blocks in the blockchain, possibly only upon meeting a PoW requirement, or whether the entities that may submit to and verify blocks in the data structure must be permissioned by some central authority. In other words, there is dispute as to whether "blockchain" by definition implies "open" or not. Embodiments of this invention do not presuppose either definition, but may be implemented with both types of blockchain.

Assume, by way of example, that a user 200 wishes to be able to prove that an event has occurred. The event either begins in digital form, or, using appropriate known methods, is reduced to being in digital form. There are in practice an almost unlimited number of such events. For example, the state of a vehicle, such as moving/stationary, position, speed, status of various engine components, etc., may be sensed and the corresponding signals may be converted into a set of digital data. Similarly, the state and operational parameters of an industrial machine or process may be sensed, accumulated, and converted into digital form. Video from a security camera may be processed into a transmittable file as a blockchain-recordable "event", etc. The signature of a customer on a credit card receipt may be digitized and stored along with the receipt itself may be an "event", as may a purchase order. And so on. Our world is full of "events", each of which, as used here, is any set of digital information that can be transmitted via a network, for example, a file that has been created or a record of something that has happened or that is observed.

Validator Identifier Embodiment

Figure 2:
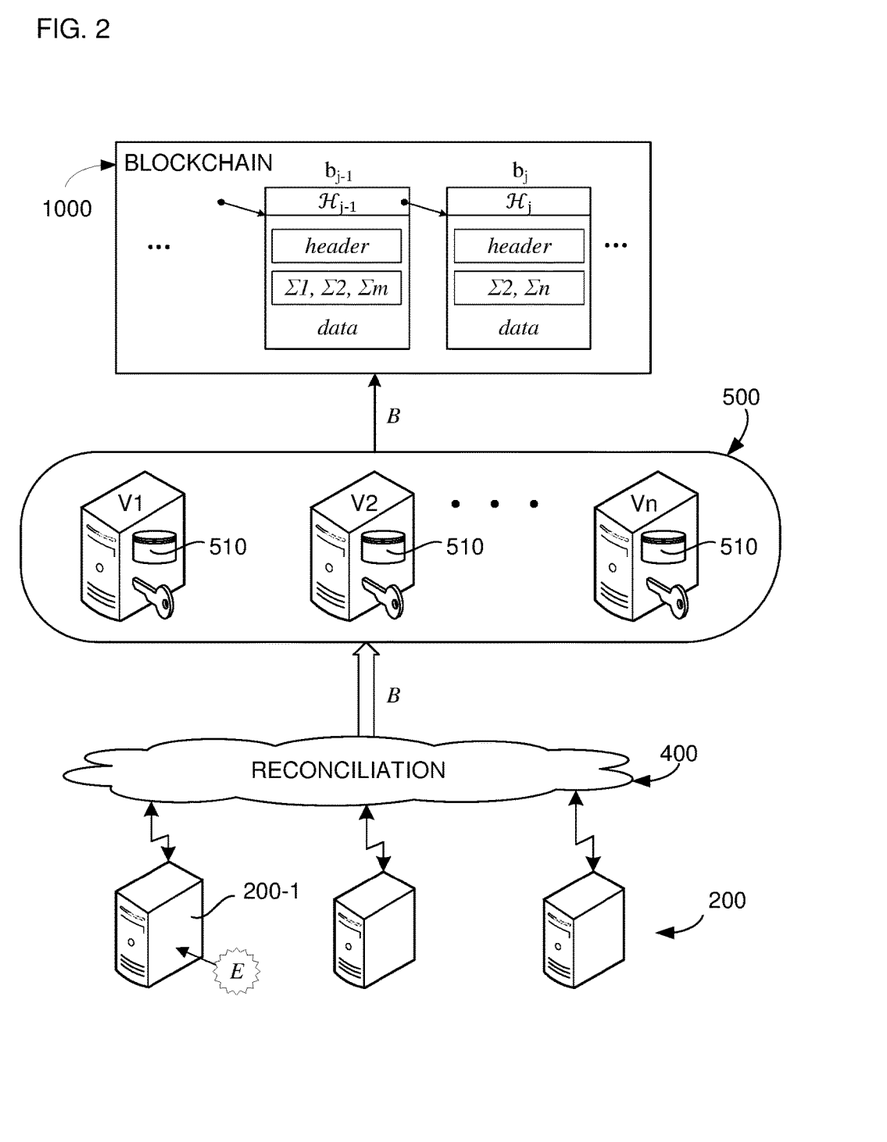
FIG. 2 illustrates an embodiment of a blockchain receipt system in which blocks store digital signatures of validators.

See FIG. 2. Merely by way of example, assume that an event E has occurred and has been sensed, via any appropriate sensor(s), input (for example, by a user), or taken place within one of the clients 200-1 and that the event is either already represented in digital form, or has been converted into digital form by any conventional means. In short, assume some data set, however formed, representing E and any chosen metadata, has arisen, been created or made available to client 200-1 and that this event is to be entered into the blockchain 1000. In some cases, the data corresponding to the event may alone be formed into a set suitable for submission as a block B to the blockchain; in other cases, using known protocols, the event data may be combined with data from other events into a suitable block B.

Assume also, however, that one or more entities is expected to validate the block B before it is entered into the blockchain 1000. For example, before a flight plan is committed to the blockchain, so as to be later verifiable, a traffic control system, a system controlled by the airline, and an onboard flight director system may be expected to verify the information in the block B, or at least one of B's component events, before it is committed to the blockchain.

As another example, there may be some plurality of validating entities, and at least some threshold number of them may be required to validate the event or block before the block is committed. For example, any of a group of government agencies might be designated as being competent to approve of a block, which may be committed to the block chain as long as some threshold number of them do so. In a simpler case, assume that parties to a proposed contract must validate the submitted text before it is committed to the blockchain. In general, assume that a threshold number m of a set of n authorized validator systems, that is, validators V1, V2, ..., Vn is either necessary, or sufficient (as determined by the system designer), to verify that a block in the blockchain is valid.

Although the validators V1, V2, ..., Vn are shown as being separate from the reconciliation system 400, this is not necessary; rather, depending on the implementation and the nature of the blockchain 1000 used, any or all of the validators 500 could also be part of the system 400 used to decide which block B is to be submitted for inclusion in the blockchain in the first place. In general, some systems will be storing the entire blockchain, or at least the currently active portion of it. These are the "ledger nodes" and may be the validators, other systems making up the reconciliation system, or other systems altogether, or some combination of these. Merely for the sake of simplicity, the description below uses as its example the case in which the validators are also the ledger nodes, storing the blockchain, and also may be the entities comprising the reconciliation system. As mentioned above, however, this is not necessary to embodiments of the invention.

As FIG. 2 illustrates, the validators include a respective storage system 510, in which some representation of the most recent, or at least some valid, version of the blockchain is stored. This is in keeping with the nature of a blockchain being distributed. The blockchain 1000 is thus, in practice, maintained as a dynamic data structure within the storage systems 510, thus comprising a form of database of representations of events as encoded in the blockchain's blocks.

According to the embodiment illustrated in FIG. 2, each member V1, V2, ..., Vn of the validator set has an identifier $\Sigma$ that is either directly, or, via a known transformation, indirectly readable and recognizable by other entities. Let $\Sigma i$ be the identifier for validator Vi. Each validator that validates a block that is entered into the blockchain 1000 thus also includes its identifier $\Sigma$ as part of the data in the respective block. In FIG. 2, block $b_{j-1}$ is shown as having been validated by validators V1, V2, and Vm, whereas block $b_j$ has been validated by V2 and Vn.

The receipt returned to whichever entity that submitted either an entire block, or an event that is included in a block, may contain the information typically used to identify the block, the various events ("transactions") encoded in the block, the time the block was created, and other metadata. In general, a receipt will be a vector of different data values, which may be compiled and transmitted by any of the validators 500, by any of the entities in the reconciliation system 400, or by some other administrative system, to the corresponding user over any network or otherwise.

In this embodiment, the receipt also includes (either as a single transmission, or as a separate part of the receipt transmission) information sufficient to communicate the identifier(s) of the validator(s) of the block. To enable self-verification, these identifiers preferably comprise a digital signature of each respective validator. The confidence of the user, or any other entity with the receipt, can then be greater, if one or more of the validators is trusted to be particularly reliable, for example, an authoritative governmental agency, or a major bank, or even a trusted individual, etc., depending on the nature of the event.

Of course, if the identifiers $\Sigma i$ are cleartext, a malicious entity could more easily fake validation of a block. The identifiers therefore preferably are based on some secure protocol. For example, using a Public Key Infrastructure (PKI)-like public-private key system, the receipt could encode the validator's underlying digital certificate, which ensures that the validators remain more transparent all the time. This would also allow the user to verify with validation keys it does not yet know about. As a convenience, the receipts could even be, for example, PDF files (for example, including portions of the block data and/or metadata, or some other file) signed by PKI signatures of the validators, with a separate receipt portion that contains the validator set 500 history. The user would then not have to figure out whether they trust the validators during validation. As long as the appropriate public keys of the validators are made available to those who might need to validate the authenticity of a block receipt, this would allow the validator set to completely change over time, and so long as the entities of the last validators are trusted, the latest validator set can directly be authenticated.

One possible disadvantage of this arrangement is that, after a long time, users may not remember which entities were authorized even to host the blockchain at the time. In such a case, the current validators could maintain a list of the previous validator set, which may be provided to users as needed or upon request; alternatively, depending on the context, after having an event successfully entered into the blockchain, clients could themselves also store the identifiers of the validators involved at the time.

History Tree Embodiment

Hash trees, sometimes known as Merkle trees, are well known in the fields of cryptology and computer science. In summary, a hash tree has lowest-level "leaf" inputs, which are iteratively combined, usually pairwise using hashing, until a single "root" value is obtained.

Figure 3:
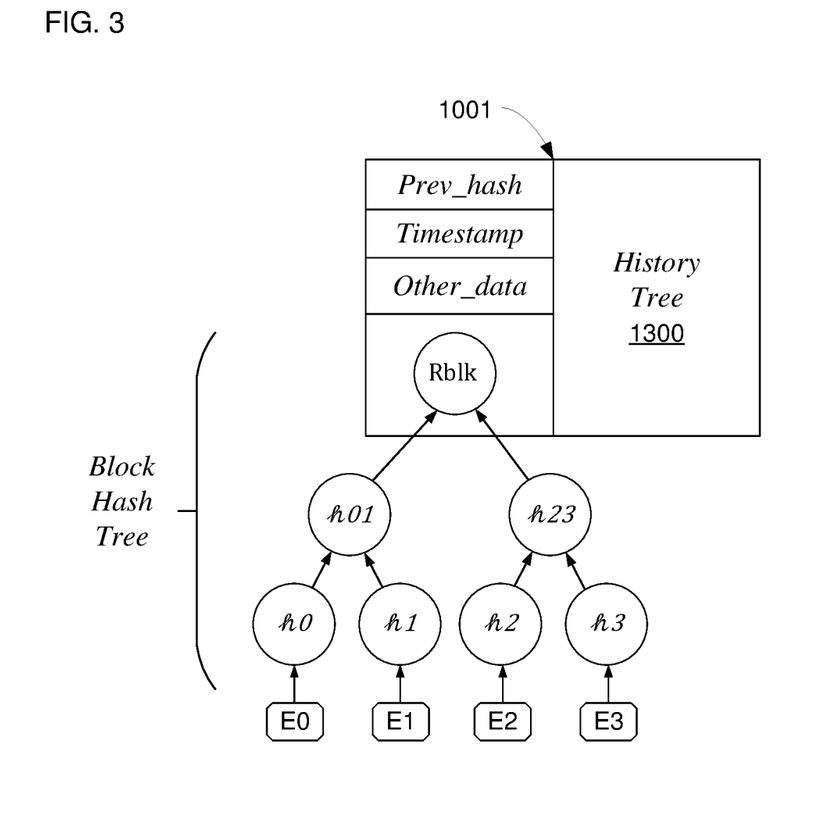
FIG. 3 shows one example of a block that includes, in addition to some conventional data elements, also includes a history tree.

See FIG. 3, which illustrates typical elements of a blockchain block, but also including a novel "history tree In the simple example shown in FIG. 3, four transactions or "events" E0, E1, E2, E3 are to be encoded in a blockchain block 1001. Similar to the blocks in FIG. 1, block 1001 includes the hash Prev_hash derived from the immediately preceding block, as well as other chosen data/metadata Other_data; for example, an identifier or even name of the blockchain itself may be included in each block, along with a block ID or series number, etc. In many blockchain implementations, each block also includes a timestamp indicating when it was created or appended or the blockchain.

In many conventional blockchains, the block will also include as an element the top-level "root" value of a binary hash tree—shown in FIG. 3 as the "Block Hash Tree"—that has, as its lowest level values, a digital representation of each event to be included or otherwise represented in the block. In the illustrated example, events E0-E3 are therefore hashed to yield $ℏ0$-$ℏ3$, respectively. These hash values are then in turn pairwise hashed, such that $ℏ01$=hash($ℏ0$, $ℏ1$) and $ℏ23$=hash($ℏ2$, $ℏ3$). The root value Rblk of the block hash tree is thus Rblk=hash($ℏ0$, $ℏ23$). In other words, at every level of the tree, each node will have a "sibling" with which it is hashed to yield the value at the next highest level, which is in turn hashed with its sibling, etc., until the top-most root value is reached.

Now consider event E2. If $ℏ3$ and $ℏ01$ are known, in addition to E2, it will be possible to compute Rblk. Thus, given a vector of "sibling" values leading up along a computation path through the hash tree, one can determine whether a purportedly correct representation E* of an event is in fact identical to the original E by iteratively, pairwise hashing the vector elements until a single topmost value is obtained. If this single value is equal to the root value Rblk then one can know that at least the input E* is equal to the E that was used to compute Rblk. This vector is therefore preferably included as part of the receipt sent to each event's originator as soon as the corresponding block is formed and included in the blockchain.

Figure 4:
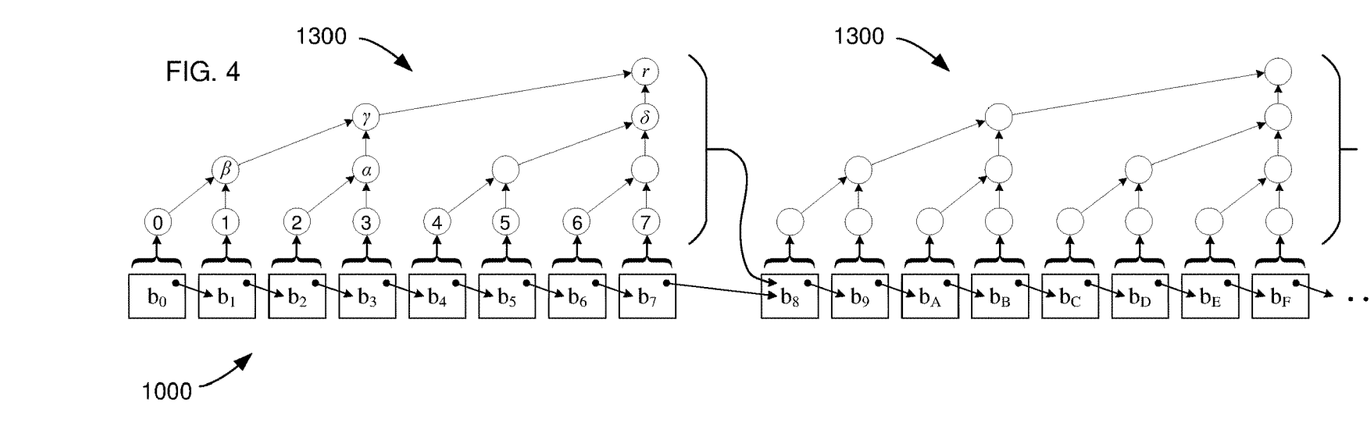
FIG. 4 illustrates an embodiment in which blockchain blocks store progressive blockchain history trees.
Figure 5A:
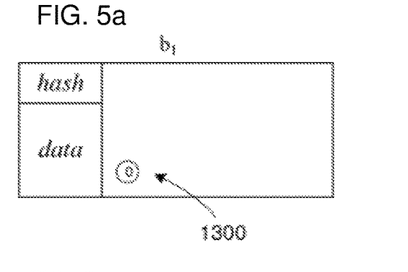
FIGS. 5a-5h illustrate a series of history trees within blocks.
Figure 5B:
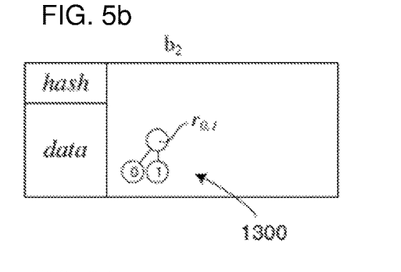
Figure 5C:
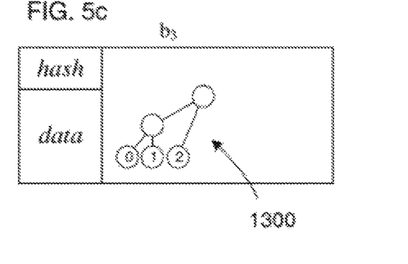
Figure 5D:
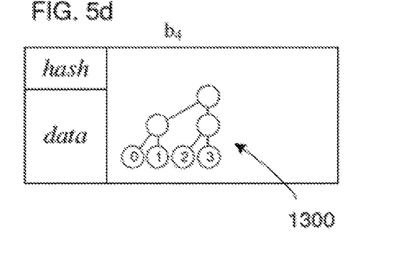
Figure 5E:
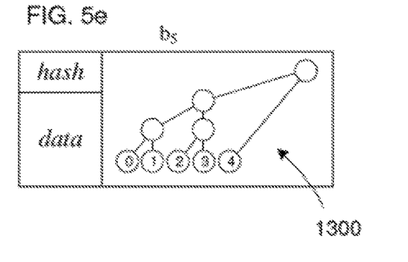
Figure 5F:
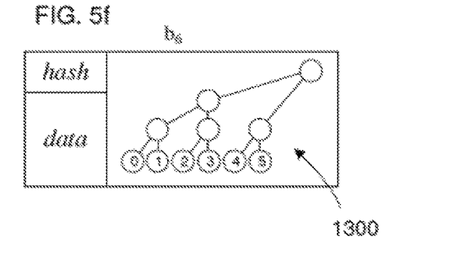
Figure 5G:
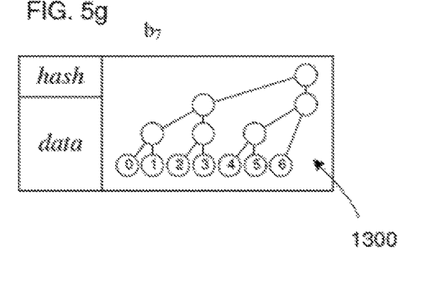
Figure 5H:
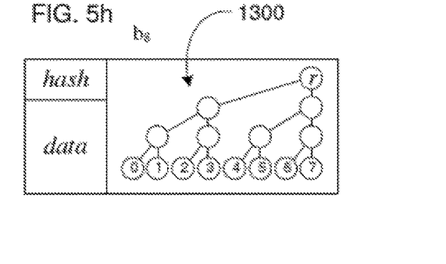

See FIG. 4. In this embodiment, blocks are grouped, either by time, or by number, or some combination of both (such as a minimum and/or maximum number of blocks per group, or a minimum and/or maximum time during which blocks are created and added to the blockchain). Assume just by way of a simple example that there are eight blocks per group. (In most practical implementations, there will usually be many more.) In the example shown in FIG. 4, two block groups are shown, namely, $b_0$-$b_7$ and $b_8$-$b_F$.

As illustrated, in this embodiment a hash tree—the history tree 1300—is created for each block group, with data associated with each block in the group forming the lowermost leaves of the group's hash tree, shown in the figure as circles numbered 0-7. Note that this history tree is "on top of" the blockchain, and is not the same as the block hash tree illustrated in FIG. 3. The data from each block used as an input to the respective tree may be chosen as any data that is uniquely associated with and identifies the block. Depending on the block size, one option would be to hash the entire contents of the block and use that value as the "leaf" value of the tree. Another option would be to use either a "raw" representation, or a hash, or some other transformation, of only a subset of the block information, such as the event data, the block hash tree root value, block ID, time, or any other sub-set. The important point is that the value submitted as the "leaf" input for each block should preferably be difficult for a malicious actor to fake using any other data as input to the hash or to "reverse" the transformation used to create the leaf value.

As shown in FIG. 4, the root value of the tree constructed on the group of block $b_0$-$b_7$ is labeled as the top node r. In this embodiment, the $b_0$-$b_7$ tree, including its root value r, is stored in the beginning block $b_8$ of the following group $b_8$-$b_F$. Similarly, block $b_0$ will include and encode the hash tree and root value for the previous block group, and the tree of the block group $b_8$-$b_F$ will be stored in the first block of the next group. What this means is that every block may encode information identifying every preceding block back to the first "genesis" block. (Another option is described below.)

Of course, the root value of the tree for a block group will not be available until the last block in the group has been created. FIGS. 5a-5h illustrate how partial hash trees may be stored in non-initial group blocks. Thus, when block $b_1$ is being formed (FIG. 5a), the only previous block in the group is $b_0$, so the only portion of the block's tree available at the time is leaf 0; this leaf 0 is therefore stored in block $b_1$. When block $b_2$ is being formed (FIG. 5b), previous blocks $b_0$ and $b_1$ will already exist, such that leaves 0 and 1 can be combined in the Merkle tree to form an intermediate root value $r_{0,1}$; the partial, two-leaf tree and its root value $r_{0,1}$ is therefore stored in block $b_2$. This process may be continued, as shown in FIGS. 5c-5g, with the partial trees of preceding group blocks being stored in each group in turn until, after block $b_7$ has been completed, an entire group hash tree can be formed and stored in the first block $b_8$ of the next block group.

Now assume that a malicious entity adds an "unauthorized" block to the blockchain, or deletes some block. In prior art systems, the main way to determine whether a given block is valid would be to compute forward from some previous block known to be in the correct blockchain path; this could involve a large, or even very large, number of computations, which may have the additional disadvantage of being too large for processing systems with relatively smaller storage capacity or processing power, such as mobile phones.

Now return to FIG. 4 and consider block $b_2$. If an entity has $b_2$ and the value of leaf 3, it can compute α=hash(leaf 2, leaf 3). Given the value β=hash(leaf 0, leaf 1), however, γ=hash(β, α) can be computed, and given δ=hash(hash(leaf 4, leaf 5), hash(leaf 6, leaf 7)), the root value r=hash(γ, δ) can be computed. In short, iterative, pairwise hashing of block hash tree "sibling" values should lead to the root value: α is the parent node of siblings leaf 2 and leaf 3; γ is the parent node of siblings β and α; and the root value r is the parent node of siblings γ, δ. Given the leaf 2 value, therefore, the only values that are needed to compute the root value r are the leaf 3 value, β and δ, since all other intermediate values can be calculated from these. As is known in binary hash tree structures, given n leaves, only $O(\log_2 n)$ values will be needed to recompute the root value r. Given a purportedly authentic copy of the information in a given block, in particular, of the information used to compute its history tree leaf value, and the parameters defining the history tree at that point in the blockchain, any entity can evaluate the proof of correctness, in that recomputation of the hash tree path from the leaf up to the root must be correct to the bit for the original root value to be recomputed.

The root value of a given block group may also be used to quickly compute "forward", through later block groups to a current group, and be used in the computation from a later leaf up to its respective group's root value. Systems that rely on a fixed set of validators are more vulnerable to undetected tampering with blocks than this embodiment, since the validator set 500 is more easily compromised (for example, even by a validator who has become an inside threat). In contrast, the history tree is stronger against such blockchain manipulations since it fixes the blockchain history itself. In this embodiment, blocks include at least partial history trees, each of which may encode information of the entire blockchain history, if the blockchain has been tampered with, an attempt to return a receipt for an invalid block would also require an ability to construct a correct history tree within the block.

In one embodiment, the root value Rblk is used as the leaf, or one of the leaves (together with any other chosen data elements), submitted to the history tree. Thus, for example, in FIG. 4, the Rblk value (which, itself is a hash value) for block $b_2$ block may be used as leaf 2 in the history tree. This would allow a later verifying entity to validate a transaction conveniently by just "plugging" the information inside a receipt into the history tree, to see if the hashes match up all the way from the event representation to the root of the corresponding history tree.

Different methods may be used to reduce the size of the history trees stored in blocks and/or required by the entities, such as, for example, validators, that generate receipts. In some implementations, some blocks may encode information that is more important than others, for example, events that have a higher classification level (such as Top Secret as opposed to only Confidential), or corresponding to higher value (such as above a chosen minimum order size or price), or from preferred clients, etc. In these cases, the system could build and store the history trees based on the leaf values of only the important blocks.

Another method would be to archive older parts of the history tree, for example, according to a schedule, and use the root of the archived part of the tree as the first leaf of a new tree. The archived portion of the tree may then be signed using any known method so as to prevent or at least be able to detect later tampering or corruption. This method may also be used independent of the notion of archiving. For example, certain blocks may be designated as "anchor blocks", essentially restarting the tree construction over.

In the embodiment shown in FIG. 4, such anchoring occurs regularly every n'th block, but it need not be so regular. Rather, validators and/or the systems in the reconciliation system 400 (which may be wholly or partially the same as the validator system 500) may choose anchor blocks according to other criteria. For example, the validators may, either on a schedule or after some triggering event occurs (such as a suspected security breach, etc.) "audit" the blockchain. One way to do this is for the validators to compute forward through all blocks from any chosen block known to be correct (a previous anchor block), and in the correct path, to a more recent block, which they can then designate as the new most recent anchor block. An auditing system could also take and store "snapshots" of the blockchain in a database, or of chosen, possibly particularly important, or randomly selected, blocks. This auditing system would then later be able to compare the stored blocks with those in the blockchain to detect any changes, or at least to confirm that those blockchain blocks are still valid; as described below, such "validated" blocks may be used as anchors from which to calculate forward to validate other sections of the blockchain. The auditor may also periodically ask for hash paths of the selected, stored blocks in the latest history tree and then double-check if the latest block still contains the same transactions.

Still another method to reduce the size of history trees stored in blocks is to have multiple aggregation levels. Assume, for example, that blocks are grouped daily (or hourly, etc.), such that a group hash tree is created daily (hourly, etc.). There will then be a new root value each day. These root values may then be used as leaves of a second-level tree, with a higher level root value. The daily root value can then be used as the first leaf of the next day's history tree. Recomputation paths from blocks can then be extended from the first-level root values up to higher level root values.

Still another way to reduce the storage requirements for the hash tree is to include in the block a pointer, such as a URL or database address, to the full representation, which can then be downloaded as needed, for example, from the validators, or from a separate archiving system.

Figure 6:
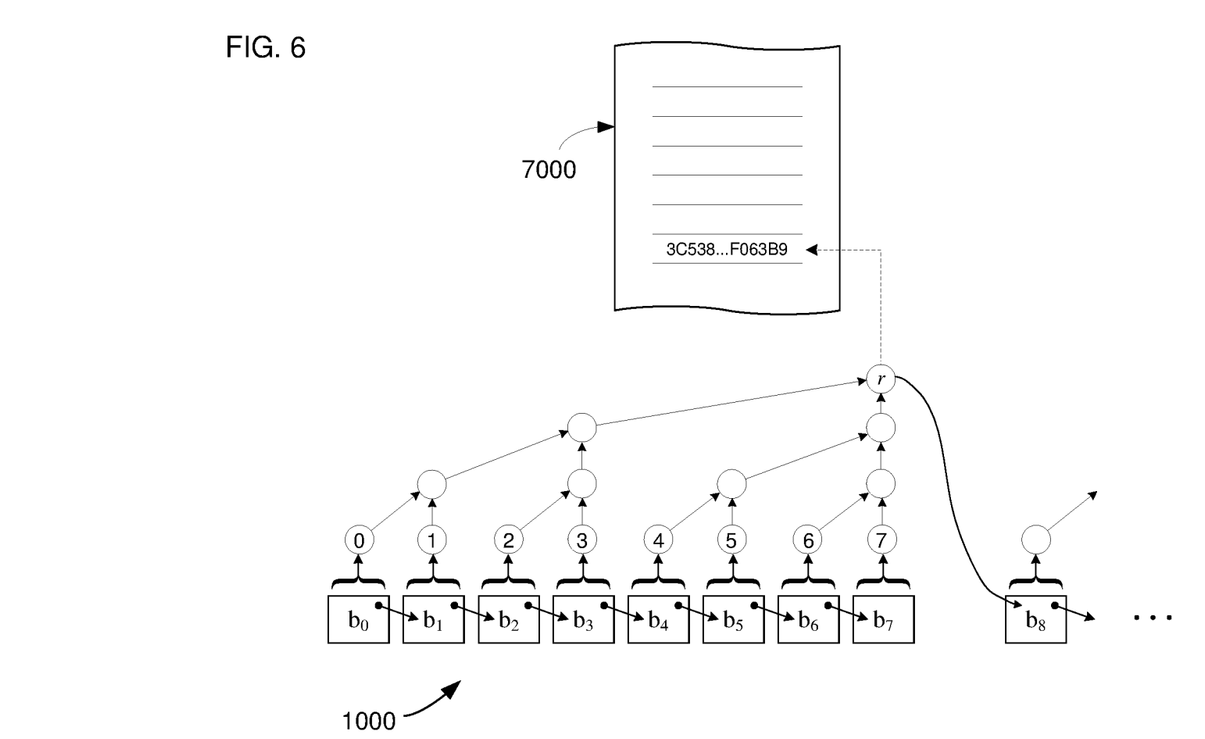
FIG. 6 shows an alternative history tree embodiment.

FIG. 6 illustrates another option, namely, that the root value for a history tree may be published in some widely witnessed, practically unalterable medium such as a widely available print publication 7000, or even some supervisory blockchain or ledger. As mentioned above, embodiments of this invention may be used with both open and closed/proprietary blockchains. The publication mechanism 7000 could even be private, such as a file within an enterprise's internal network, and as long as the blockchain is accessible to the enterprise. In other words, even if the blockchain itself is accessible to outside entities, a private entity could maintain its own internal confirmation mechanism using any form of archiving or permanent recording of any, or any function of, root values.

In the embodiment illustrated in FIGS. 3 and 4, entire history trees are included in at least some of the blocks in the blockchain. In the extreme case, the entire history tree from the genesis block may be encoded into each subsequent block. This may of course require not only increasingly large storage, but may also entail maintenance of portions of a history tree that are no longer relevant. In the embodiment illustrated in FIG. 6, the entirety of a history tree is "collapsed" into its root value, which is then passed to the next group of blocks. This makes it possible to keep the number of tree nodes to no greater than a chosen maximum, but it also means loss of block-level "leaf" information for the whole of the "collapsed" tree.

Figure 7A:
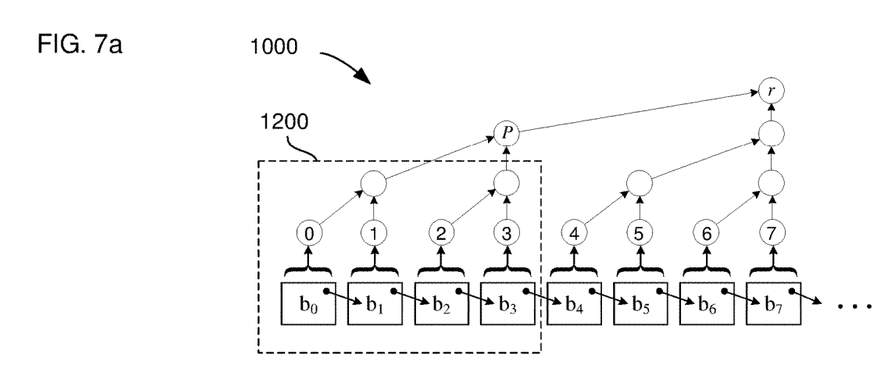
FIG. 7a illustrates "pruning" of a history tree.
Figure 7B:
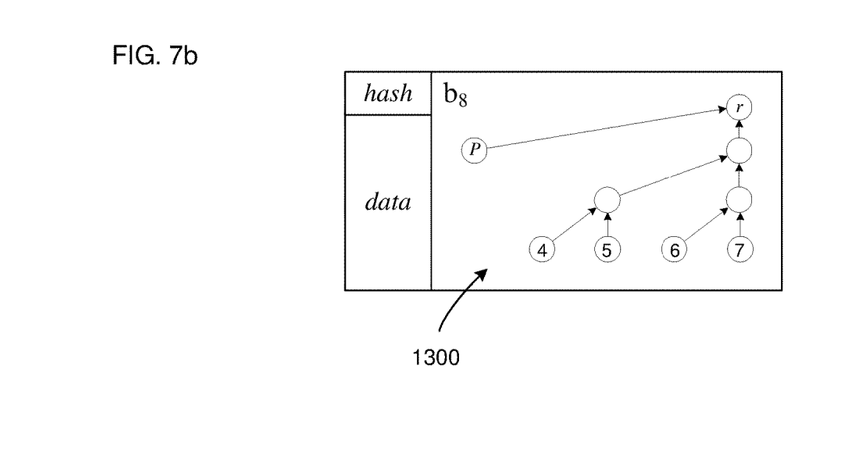
FIG. 7b illustrates how a pruned history tree may be included in a blockchain block.

FIGS. 7a and 7b illustrate another embodiment that falls between the "all or none" approaches. To understand FIGS. 7a and 7b, consider a greatly simplified case in which there are eight blocks $b_0$-$b_7$ for which a history tree has been constructed. In realistic implementations, the tree may contain orders of magnitude more leaves. Now assume that the information in blocks $b_0$-$b_3$ is no longer needed. For example, block information before some time or some event (that is, a particular block) might no longer be relevant to current or future needs. This means that the leaf nodes and computation nodes leading to node P, that is, the nodes within the dashed box 1200, are also not needed. In this embodiment, the branches of the history tree below node P, that is, the sub-tree below P, is therefore deleted, that is, "pruned" from the subsequent representations of the history tree, such that the pruned sub-tree is "collapsed" into its partial root value P. Pruning may be done by whichever entity is adding the next block to the blockchain, or by a validator, or any other chosen entity.

The history tree passed to and stored in the next bloc $b_8$ will therefore be as shown in FIG. 7b, where P's sub-tree is replaced with only P, but the rest of the history tree, including leaf-level information, is intact. All the currently relevant information in the history tree is thus preserved, while the tree information no longer needed is "compressed" into its partial root value P. Of course, the "pruning" process shown in FIGS. 7a and 7b may be repeated at different points in the blockchain, and pruned sub-trees may be archived for later recovery or examination.

In several instances mentioned above, one or more of the history trees, or selected blocks, may be "fixed" not only by virtue of being in the blockchain 1000, but also by using a secondary method that can be independent of the blockchain. In other words, sets of values can be "signed" so that any changes can be detected. One way to sign values is to include them in yet another, independent blockchain. Another alternative is to use standard PKI-based signatures.

A particularly advantageous signing method is disclosed in U.S. Pat. No. 8,719,576 (also Buldas, et al., "Document verification with distributed calendar infrastructure"), assigned to Guardtime, Inc., which is incorporated here by reference. The Guardtime signature infrastructure takes essentially arbitrary data sets as inputs, and then combines them iteratively and pairwise in a hash tree until a root value is computed for all the inputs during a "calendar period". Each root value is entered into a data structure called a "calendar", which also implements a Merkle tree to progressively combine the calendar values to create an uppermost value, which can then periodically be published either physically or digitally. A Guardtime signature comprises a vector of parameters enabling recomputation of the pairwise hash operations up to at least the level of the respective calendar value, and, after extension, to the published value.

One advantage of the Guardtime infrastructure is its enormous scalability and flexibility. Furthermore, a Guardtime signature is highly "portable" since it can prove that a purportedly authentic instance of a data set has not been altered given the instance and its signature, without necessarily requiring access to an external authority and without requiring keys, a certificate authority, etc. The Guardtime signature can thus be stored or shared openly, with no intrinsic need for additional security measures such as keys. Still another advantageous feature of a Guardtime signature is that it is associated with the calendar time in which it was generated, such that the signature also can act as a timestamp.

Assume that a user has submitted data identifying an event, this has been recorded in the blockchain 1000, and an administrator (for example, one of the validators) has returned a receipt for the event. This receipt will typically include a hash of the respective event, the hash path of the block hash tree up to its root Rblk stored within the block, and any other chosen information, such as information enabling identification of the corresponding block, such as block ID and the event/transaction ID, plus, depending on the implementation and embodiment, other data such as the time the block was created, an identifier of the blockchain itself, the set of validators that validated the block (as shown by the signatures in the block). To reduce the size of the receipt, it would also be possible for the receipt to comprise a pointer into a database that contains the detailed receipt information.

Now assume that a third party wishes to verify that an event (in the sense described above) occurred and was properly registered in a valid block within the blockchain. The user may then present (for example, simply by sending it electronically) the corresponding receipt to the third party, who can then recompute the block hash tree path defined in the receipt to see if it leads to the same value Rblk stored in the block.

Embodiments of this invention provide methods that allow the verifying third party to also determine, at least with greater reliability than before, that the block itself is valid. One way to do this is to check the identities, via the signatures, of the validators that participated in approving the block. Another way is to take the values in the purportedly valid block and recompute the included history tree, from the leaf values (which will include information from at least one previous block), iteratively and pairwise, through the intermediate node values, to the root, to check whether the root value is the same as it was when the block was first created. Note that that a root value will be stored within the block, or may be stored in a database, or, depending on what is passed from the block, may also be available in a subsequent block or block group. If this verification is successful, the third party may with higher confidence than before accept the description of the event as being correct, at least in the sense of being the same as it was purported to be.

On the other hand, verification of either the event/receipt and/or block may fail. For example, one or more validator signatures may not be verifiable, or there may be an insufficient number of them, or the signature of a later disqualified validator may be found. Using the history tree embodiment, recomputation of the history tree may fail. In such cases, any violation protocol may be followed. At the simplest level, the third party may simply decline to accept the user's submitted receipt as being valid for whatever purpose it was submitted. Such a verification failure may also be a triggering event as described above, where the validators, or the entities comprising the reconciliation system (some or all of whom may be the same as the validators), initiate a review and possible recomputation of the blockchain from some block known to be valid.

Although the validator signature embodiment and the history tree embodiment are described in separate text sections above, it would be possible in yet another embodiment to include both verification mechanisms in blockchain blocks. In other words, blocks could contain validator signatures, and also a history tree. To further integrate the mechanisms, it would be possible to include a function (preferably, hash) of the validator signatures in the data used as the leaf values of the history tree.

What is claimed is:

1. A method for testing the validity of entries in a database data structure, comprising:
in at least one blockchain node server, receiving a signal from a client system to register an event in the database data structure, said database data structure comprising a blockchain, which in turn comprises a sequentially linked series of blocks such that each block encodes at least partial state information of an immediately preceding block;
within at least selected blocks of the blockchain after an initial block in a group of blocks, which includes the initial block, including a representation of a history hash tree, including its structure, having a highest-level root value and, as lowest level inputs, a plurality of leaf input values derived from block-specific information stored in the initial block in the group of blocks, and at least one other block in the group of blocks, said block-specific information encoding data corresponding to each event that the respective block comprises and each leaf input value corresponding to the block-specific information of a corresponding one of the initial block or at least one other block,
computing said highest level root value by iterative, pairwise functional combination of the leaf input values and intermediate history tree node values;
in a block-verification phase, verifying a purportedly valid block by recomputing the highest-level root value from the representation of the history hash tree included in the purportedly valid block, including the information of the at least one preceding selected block, and accepting the purportedly valid block as being valid only if the recomputed highest-level root value is the same as the highest-level root value originally computed for the corresponding block.

2. The method of claim 1, further comprising:
registering the event as one of a plurality of events that are combined using a block hash tree by iterative, pairwise hashing until a single block root value is computed;
for each event registered in the block, returning to the client system a receipt, said receipt encoding at least an identifier of the block and block sibling hash tree values enabling recomputation of the block root value by iterative, pairwise recomputation of the event with the block sibling hash tree values;
whereby a purportedly authentic representation of the event may be subsequently verified as being validly included in the block if, upon recomputing a block hash tree path represented by the block sibling values, from the purportedly authentic representation of the event up through the block hash tree, the same block root value is obtained as is contained in the receipt.

3. The method of claim 2, further comprising submitting the block root value as the leaf input value of the respective block.

4. The method of claim 1, further comprising:
grouping the series of blockchain blocks into block groups;
for each group, computing a separate group history hash tree, each having a root value for the respective block group; and
storing the root value of each group in the first block of an immediately following group history hash tree, such that the initial input value of the immediately following group encodes the root value of the history hash tree of the previous group.

5. The method of claim 4, further comprising computing progressively growing, partial group history hash trees for each series of blocks within a group by constructing, for each block in the group, a hash tree of the tree input values of all the previous blocks in the same group, each partial group history hash tree having a partial group root value.

6. The method of claim 1, further comprising:
grouping the series of blockchain blocks into block groups;
for each group, computing a separate group history hash tree, each having a root value for the respective block group; and
storing a representation of the entire history hash tree of the immediately preceding group of blocks in the first block of each group of blocks, such that the initial input value of each group encodes the history hash tree of the previous group.

7. The method of claim 1, further comprising:
storing and digitally signing a previous portion of the history hash tree; and
beginning with the next selected block after the previous portion, restarting and storing in newly created blocks a new, progressively constructed history hash tree having the root value of the previous portion of the history hash tree as an initial hash tree input value.

8. The method of claim 7, further comprising publishing the root value of the previous portion of the history hash tree in a medium that is irrefutable with respect to third parties of interest.

9. The method of claim 1, further comprising:
progressively augmenting the history hash tree by adding to it a new lowest-level leaf node for each of a series of the blocks and recomputing the root value for the history hash tree;
deleting from the history hash tree a selected set of the lowest-level nodes and portions of the tree corresponding to aggregation of the selected set; and
computing a partial root value for the selected set and representing in the history hash tree the deleted selected set as the corresponding partial root value.

10. The method of claim 1, further comprising:
submitting the block to at least one validating system and, for each validating system that approves the block for entry into the blockchain, including within the corresponding block an identifier of the validating system;
if a selected set of validating systems has approved the block, entering the block as a most recent entry in the blockchain; and
including in the receipt at least the identifiers of the validating systems that approved the block.

11. A method for testing the validity of entries in a database data structure, comprising:
in at least one blockchain node server, receiving a signal from a client system to register an event in the database data structure, said database data structure comprising a blockchain, which in turn comprises a sequentially linked series of blocks such that each block encodes at least partial state information of an immediately preceding block;
within at least selected blocks of the blockchain after an initial block, including a representation of a history hash tree having a highest-level root value and, as lowest level inputs, leaf input values derived from block-specific information stored in at least one preceding selected block, said block-specific information encoding data corresponding to each event that the respective block comprises, computing said highest level root value by iterative, pairwise functional combination of the leaf input values and intermediate history tree node values;

progressively augmenting the history hash tree by adding to it a new lowest-level leaf node for each of a series of the blocks and recomputing the root value for the history hash tree;

deleting from the history hash tree a selected set of the lowest-level nodes and portions of the tree corresponding to aggregation of the selected set; and computing a partial root value for the selected set and representing in the history hash tree the deleted selected set as the corresponding partial root value in a block-verification phase, verifying a purportedly valid block by recomputing the highest-level root value from the representation of the history hash tree included in the purportedly valid block, including the information of the at least one preceding selected block, and accepting the purportedly valid block as being valid only if the recomputed highest-level root value is the same as the highest-level root value originally computed for the corresponding block.

12. A method for testing the validity of entries in a database data structure, comprising:

in at least one blockchain node server, receiving a signal from a client system to register an event in the database data structure, said database data structure comprising a blockchain, which in turn comprises a sequentially linked series of blocks such that each block encodes at least partial state information of an immediately preceding block;

within at least selected blocks of the blockchain after an initial block, including a representation of a history hash tree having a highest-level root value and, as lowest level inputs, leaf input values derived from block-specific information stored in at least one preceding selected block, said block-specific information encoding data corresponding to each event that the respective block comprises, computing said highest level root value by iterative, pairwise functional combination of the leaf input values and intermediate history tree node values;

grouping the series of blockchain blocks into block groups;

for each group, computing a separate group history hash tree, each having a root value for the respective block group; and storing the root value of each group in the first block of an immediately following group history hash tree, such that the initial input value of the immediately following group encodes the root value of the history hash tree of the previous group;

computing progressively growing, partial group history hash trees for each series of blocks within a group by constructing, for each block in the group, a hash tree of the tree input values of all the previous blocks in the same group, each partial group history hash tree having a partial group root value in a block-verification phase, verifying a purportedly valid block by recomputing the highest-level root value from the representation of the history hash tree included in the purportedly valid block, including the information of the at least one preceding selected block, and accepting the purportedly valid block as being valid only if the recomputed highest-level root value is the same as the highest-level root value originally computed for the corresponding block.

* * * * *